US012682035B2

(12) United States Patent
Dutta et al.

(10) Patent No.: US 12,682,035 B2
(45) Date of Patent: Jul. 14, 2026

(54) STORAGE METHODS AND DEVICES WITH SECURE CUSTOMER-UPDATABLE MACHINE LEARNING MODELS

(71) Applicant: Western Digital Technologies, Inc., San Jose, CA (US)

(72) Inventors: Bishwajit Dutta, Bangalore (IN); Vinod Sasidharan, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 164 days.

(21) Appl. No.: 18/615,678

(22) Filed: Mar. 25, 2024

(65) Prior Publication Data

US 2025/0298880 A1 Sep. 25, 2025

(51) Int. Cl.
*G06F 21/33* (2013.01)
*G06F 21/64* (2013.01)
(Continued)

(52) U.S. Cl.
CPC .............. *G06F 21/33* (2013.01); *G06F 21/64* (2013.01); *G06F 21/121* (2013.01); *G06F 21/572* (2013.01)

(58) Field of Classification Search
None
See application file for complete search history.

(56) References Cited

U.S. PATENT DOCUMENTS

| | | | |
|---|---|---|---|
| 5,535,355 A | 7/1996 | Scales | |
| 10,346,927 B1 * | 7/2019 | Lunt | ................... G06Q 40/123 |

(Continued)

FOREIGN PATENT DOCUMENTS

| | | | | | |
|---|---|---|---|---|---|
| CN | 110705350 A | * | 1/2020 | ............. | G06F 18/24 |
| CN | 111222181 A | * | 6/2020 | ............. | G06F 21/64 |

(Continued)

OTHER PUBLICATIONS

Ajitesh Srivastava; Angelos Lazaris; Benjamin Brooks; Rajgopal Kannan; and Viktor K. Prasanna (Predicting Memory Accesses: The Road to Compact ML-driven Prefetcher); p. 10; Published in (Year: 2019).*

(Continued)

*Primary Examiner* — Ali H. Cheema

(74) *Attorney, Agent, or Firm* — LOZA & LOZA, LLP; Gabriel Fitch

(57) ABSTRACT

A data storage device stores a set of pre-trained machine learning (ML) models along with corresponding customer digital certificates and other information. Techniques are provided herein for allowing customers to access selected ML models using a digital certificate and a public key so that the selected ML models may then be loaded into a data storage controller of the data storage device for use, for example, by firmware of the controller to intelligently control data pre-fetch, data relocation, or other data processing functions. Techniques are also provided to allow customers to selectively update or replace ML models with customer-supplied models, subject to authentication of the customer and verification of the compatibility of the ML model within the data storage controller. Still other techniques are provided for allowing ML models from the data storage device to be loaded into a secure enclave within the host to execute within the secure enclave.

25 Claims, 10 Drawing Sheets

(51) Int. Cl.

| | | |
|---|---|---|
| *G06F 21/12* | (2013.01) | |
| *G06F 21/57* | (2013.01) | |

(56) References Cited

U.S. PATENT DOCUMENTS

| | | | | |
|---|---|---|---|---|
| 11,599,302 | B2 * | 3/2023 | Lee | G06F 9/44505 |
| 2007/0192855 | A1 * | 8/2007 | Hulten | H04L 63/1483 |
| | | | | 707/E17.115 |
| 2017/0169358 | A1 | 6/2017 | Choi et al. | |
| 2019/0114078 | A1 * | 4/2019 | Oh | G06F 3/0604 |
| 2019/0362083 | A1 * | 11/2019 | Ortiz | G06N 20/00 |
| 2020/0012662 | A1 * | 1/2020 | Walters | G06N 3/088 |
| 2020/0257518 | A1 | 8/2020 | Liedtke et al. | |
| 2020/0341941 | A1 | 10/2020 | Dastidar et al. | |
| 2021/0072901 | A1 * | 3/2021 | Kale | G06N 3/08 |
| 2021/0112101 | A1 * | 4/2021 | Crabtree | G06F 16/2477 |
| 2021/0125051 | A1 * | 4/2021 | Linton | G06N 3/08 |
| 2021/0357800 | A1 | 11/2021 | Sharma et al. | |
| 2021/0375011 | A1 * | 12/2021 | Liu | G16H 30/40 |
| 2021/0397359 | A1 | 12/2021 | Richardson | |
| 2022/0121930 | A1 | 4/2022 | Lloyd et al. | |
| 2024/0095315 | A1 * | 3/2024 | Bartfai-Walcott | G06F 21/107 |
| 2024/0118835 | A1 * | 4/2024 | Xue | G06F 3/0659 |
| 2024/0345818 | A1 * | 10/2024 | Baek | G06Q 20/102 |
| 2024/0388444 | A1 * | 11/2024 | Wang | G06F 21/16 |
| 2025/0069112 | A1 * | 2/2025 | Chun | G06Q 30/02 |
| 2025/0088542 | A1 * | 3/2025 | Crabtree | G06F 16/951 |
| 2025/0148278 | A1 * | 5/2025 | Long | G06N 3/091 |
| 2025/0165226 | A1 * | 5/2025 | Roper, Jr. | G06N 3/045 |
| 2025/0300900 | A1 * | 9/2025 | Shah | H04L 41/16 |

FOREIGN PATENT DOCUMENTS

| | | | | | |
|---|---|---|---|---|---|
| CN | 108434740 | B | * | 1/2021 | A63F 13/56 |
| CN | 113111880 | A | * | 7/2021 | G06F 18/24 |
| CN | 113836538 | A | * | 12/2021 | G06F 21/57 |
| CN | 114898351 | A | * | 8/2022 | G06V 30/1801 |
| CN | 114912567 | A | * | 8/2022 | G06N 3/04 |
| CN | 112330816 | B | * | 3/2024 | G06T 19/006 |
| CN | 111340237 | B | * | 4/2024 | G06N 20/00 |
| CN | 113221762 | B | * | 7/2024 | G06F 18/214 |
| CN | 118476200 | A | * | 8/2024 | H04W 24/02 |
| EP | 3974985 | A1 | | 3/2022 | |
| EP | 4468153 | A1 | * | 11/2024 | G06N 20/00 |
| GB | 2585110 | A | * | 12/2020 | G06Q 10/00 |
| JP | 2009134368 | A | | 6/2009 | |
| RU | 2811535 | C2 | * | 1/2024 | |
| WO | WO-2023106686 | A1 | * | 6/2023 | H04N 21/475 |
| WO | WO-2024074226 | A1 | * | 4/2024 | H04L 63/0823 |

OTHER PUBLICATIONS

Suphannee Sivakorn, George Argyros, Kexin Pei, Angelos D. Keromytis, and Suman Jana (HVLearn: Automated Black-box Analysis of Hostname Verification in SSL/TLS Implementations); p. 18; Published in (Year: 2017).*

"WD Purple™ HDDs Optimized for Performance and Low Power", Western Digital Corporation; Sep. 2022; https://documents. westerndigital.com/content/dam/doc-library/en_us/assets/public/ western-digital/collateral/tech-brief/tech-brief-wd-purple-hdds-optimized-for-performance-and-low-power.pdf; 2 pages.

"Dedicated Storage Service (DSS)—Physically Isolated Storage Resource Pool Exclusively Available to a Tenant", Orange Business; https://cloud.orange-business.com/en/offers/infrastructure-iaas/ public-cloud/features/dedicated-storage-service/ (Website); 2 pages.

* cited by examiner

100

200

DEDICATED ML ZONE

300

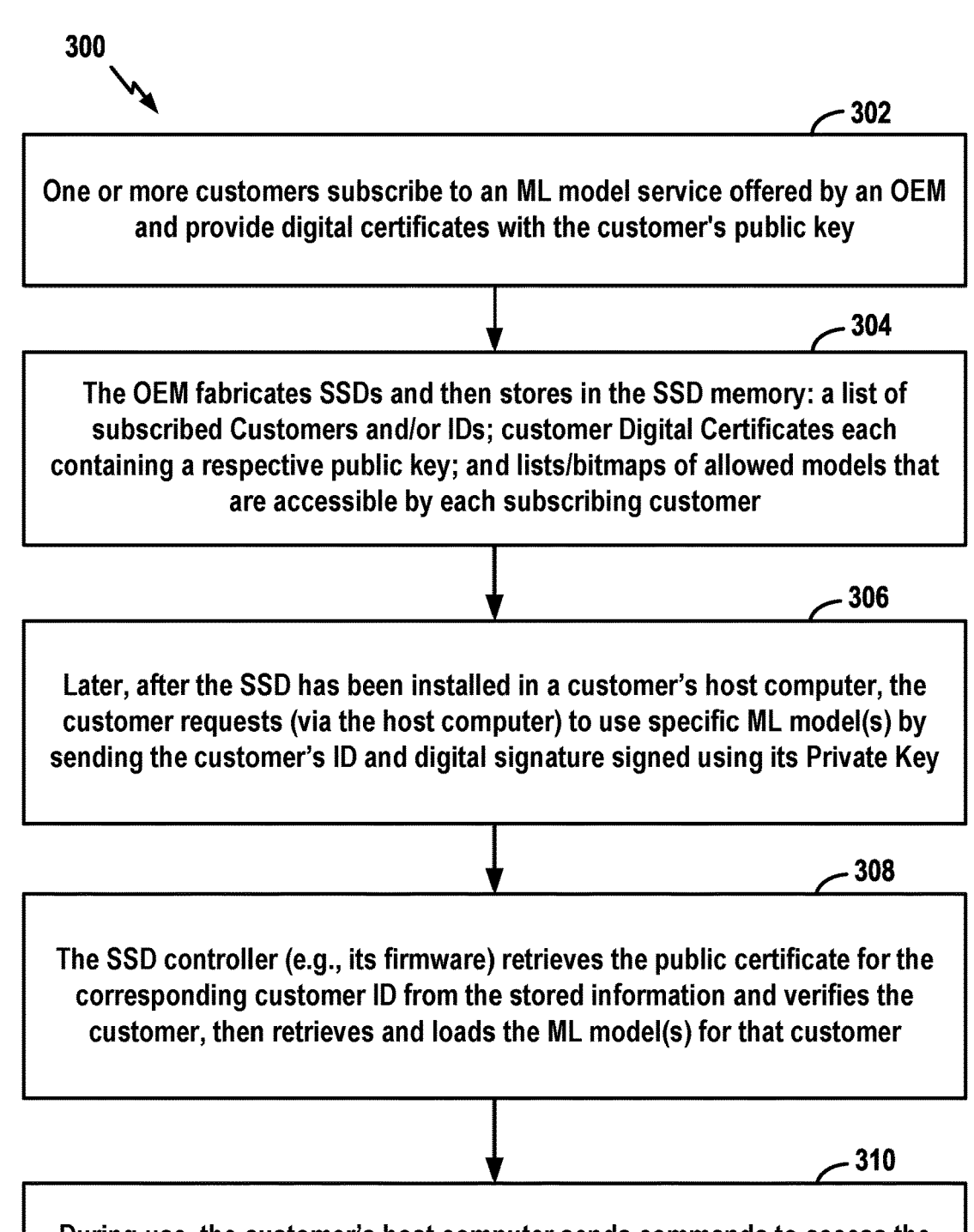

302

One or more customers subscribe to an ML model service offered by an OEM and provide digital certificates with the customer's public key

304

The OEM fabricates SSDs and then stores in the SSD memory: a list of subscribed Customers and/or IDs; customer Digital Certificates each containing a respective public key; and lists/bitmaps of allowed models that are accessible by each subscribing customer

306

Later, after the SSD has been installed in a customer's host computer, the customer requests (via the host computer) to use specific ML model(s) by sending the customer's ID and digital signature signed using its Private Key

308

The SSD controller (e.g., its firmware) retrieves the public certificate for the corresponding customer ID from the stored information and verifies the customer, then retrieves and loads the ML model(s) for that customer

310

During use, the customer's host computer sends commands to access the SSD to, for example, retrieve stored data using a pre-fetch procedure that exploits the ML model(s) to provide optimized LBA predictions, or to relocate data (e.g., perform garbage collection, wear leveling, flush operations, or fold operations) using the ML model optimize the relocation, with some of the ML models selected based on current workload or application

FIG. 3

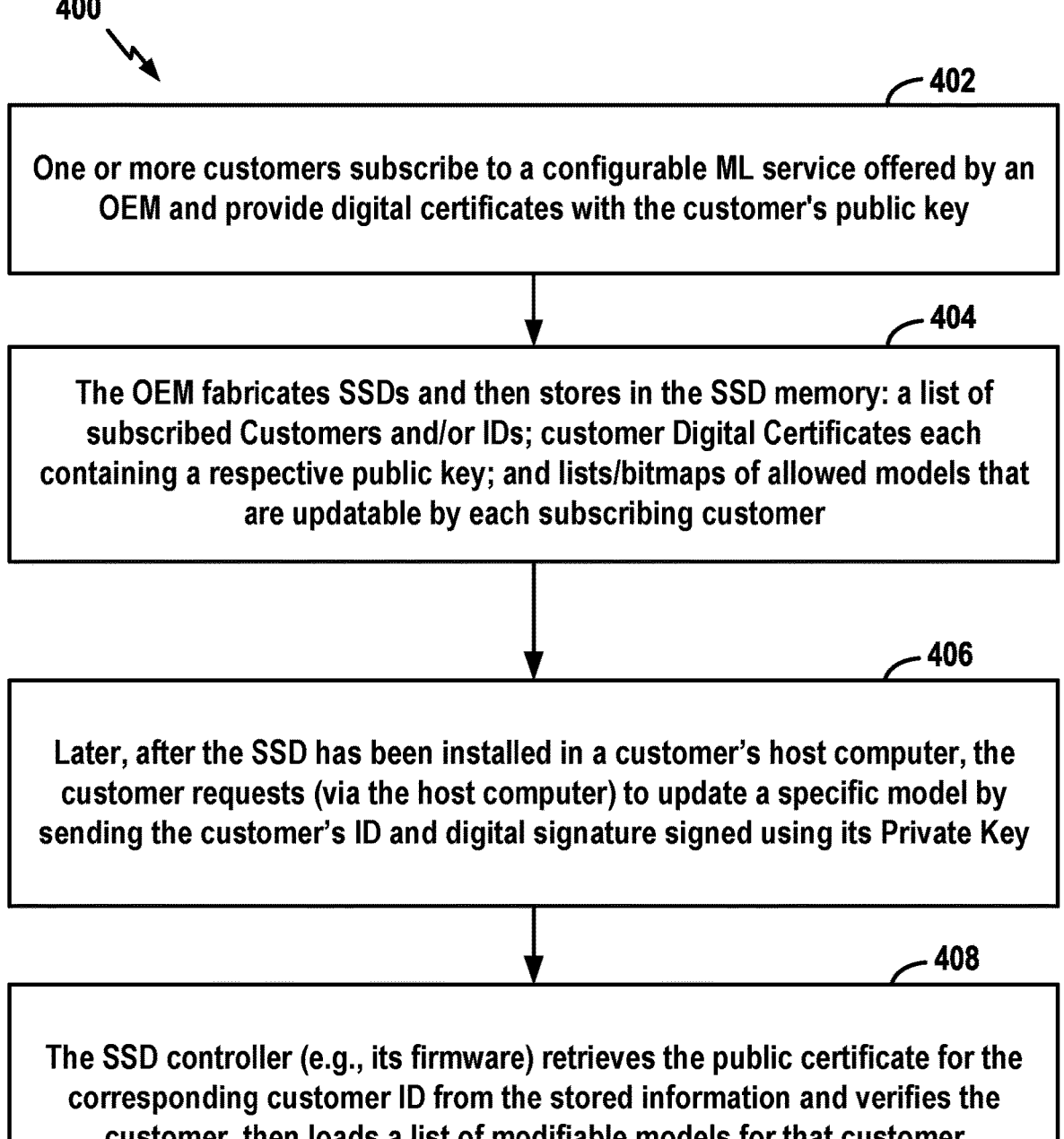

400

402

One or more customers subscribe to a configurable ML service offered by an OEM and provide digital certificates with the customer's public key

404

The OEM fabricates SSDs and then stores in the SSD memory: a list of subscribed Customers and/or IDs; customer Digital Certificates each containing a respective public key; and lists/bitmaps of allowed models that are updatable by each subscribing customer

406

Later, after the SSD has been installed in a customer's host computer, the customer requests (via the host computer) to update a specific model by sending the customer's ID and digital signature signed using its Private Key

408

The SSD controller (e.g., its firmware) retrieves the public certificate for the corresponding customer ID from the stored information and verifies the customer, then loads a list of modifiable models for that customer

FIG. 4

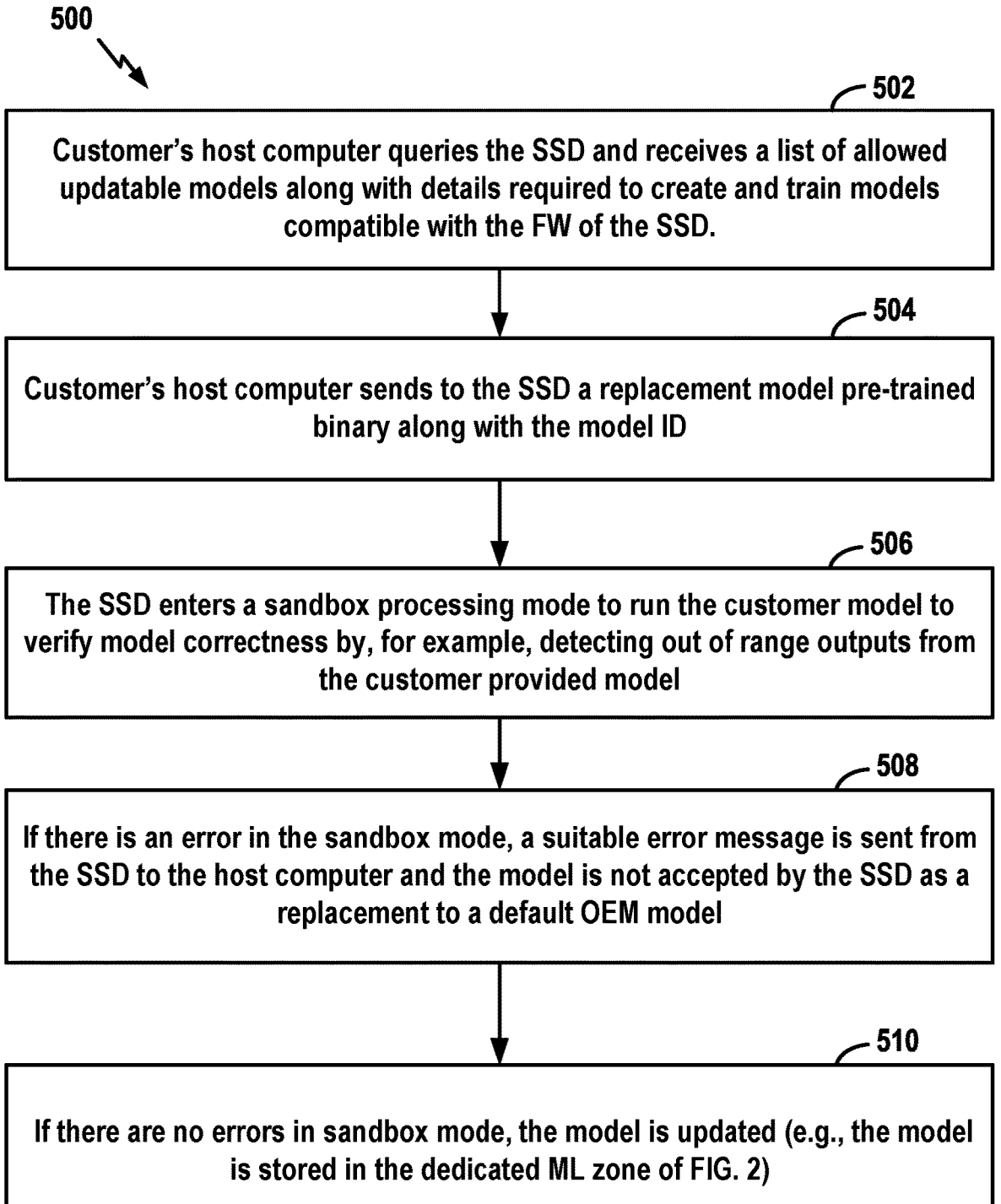

500

502

Customer's host computer queries the SSD and receives a list of allowed updatable models along with details required to create and train models compatible with the FW of the SSD.

504

Customer's host computer sends to the SSD a replacement model pre-trained binary along with the model ID

506

The SSD enters a sandbox processing mode to run the customer model to verify model correctness by, for example, detecting out of range outputs from the customer provided model

508

If there is an error in the sandbox mode, a suitable error message is sent from the SSD to the host computer and the model is not accepted by the SSD as a replacement to a default OEM model

510

If there are no errors in sandbox mode, the model is updated (e.g., the model is stored in the dedicated ML zone of FIG. 2)

ML EXECUTING IN A
SECURE ENCLAVE  610

TRUSTED MEMORY REGION/
SECURE ENCLAVE

HOST DRAM

HOST WITH SECURE ENCLAVE
CAPABILITY

604

SSD CONFIGURED FOR
USE WITH A HOST
EQUIPPED WITH A
SECURE ENCLAVE

700

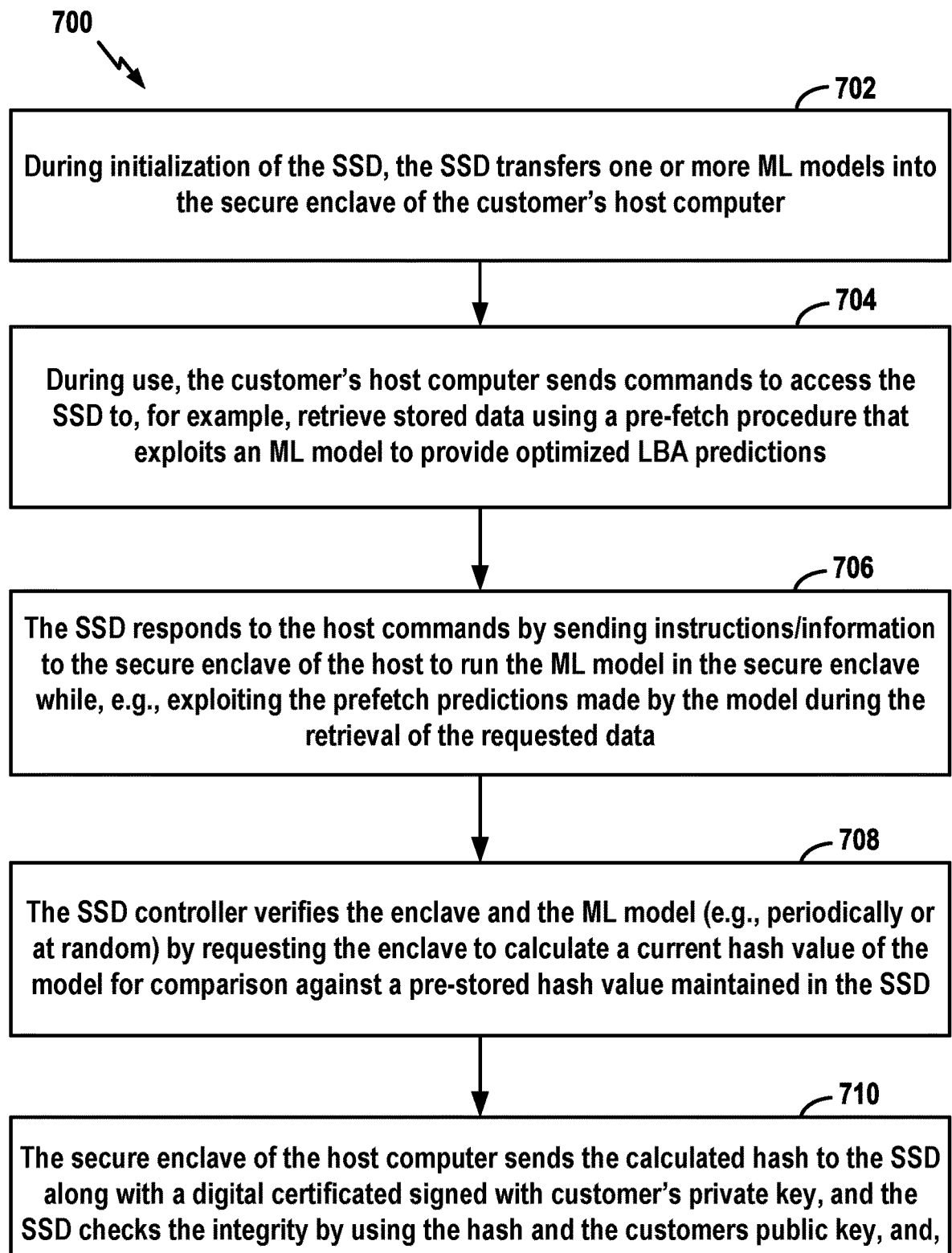

702

During initialization of the SSD, the SSD transfers one or more ML models into the secure enclave of the customer's host computer

704

During use, the customer's host computer sends commands to access the SSD to, for example, retrieve stored data using a pre-fetch procedure that exploits an ML model to provide optimized LBA predictions

706

The SSD responds to the host commands by sending instructions/information to the secure enclave of the host to run the ML model in the secure enclave while, e.g., exploiting the prefetch predictions made by the model during the retrieval of the requested data

708

The SSD controller verifies the enclave and the ML model (e.g., periodically or at random) by requesting the enclave to calculate a current hash value of the model for comparison against a pre-stored hash value maintained in the SSD

710

The secure enclave of the host computer sends the calculated hash to the SSD along with a digital certificated signed with customer's private key, and the SSD checks the integrity by using the hash and the customers public key, and, if verified, attests to the integrity of the secure enclave

Data Storage Device (DSD)

902

A memory configured to store a set of machine learning models and corresponding customer digital certificates

904

Data storage controller with one or more processors configured, individually or collectively, to:

- receive, from a customer host computer, a customer digital certificate corresponding to one of the set of machine learning models stored in the memory of the data storage device;

- retrieve the machine learning model that corresponds to the customer digital certificate from the memory;

- load the retrieved machine learning model into a processing component (e.g., a processing device of the DSD); and

- process customer data using information obtained from the machine learning model loaded into the processing component

*FIG. 9*

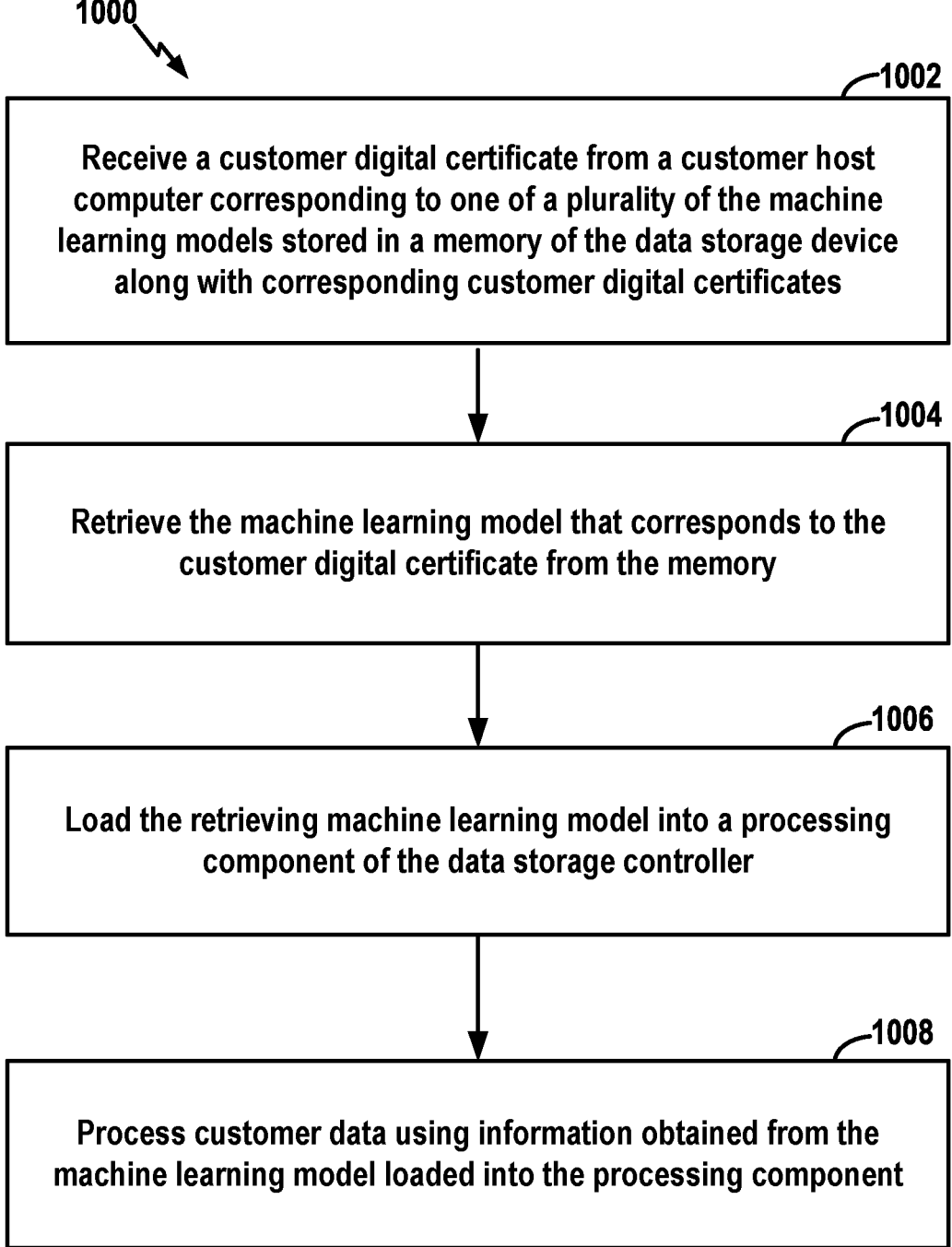

1000

1002

Receive a customer digital certificate from a customer host computer corresponding to one of a plurality of the machine learning models stored in a memory of the data storage device along with corresponding customer digital certificates

1004

Retrieve the machine learning model that corresponds to the customer digital certificate from the memory

1006

Load the retrieving machine learning model into a processing component of the data storage controller

1008

Process customer data using information obtained from the machine learning model loaded into the processing component

*FIG. 10*

STORAGE METHODS AND DEVICES WITH SECURE CUSTOMER-UPDATABLE MACHINE LEARNING MODELS

FIELD

The disclosure relates, in some aspects, to data storage devices such as hard disk drives (HDDs) or non-volatile memory (NVM) arrays. More specifically, but not exclusively, the disclosure relates to storage devices configured for storing machine learning models.

INTRODUCTION

As storage device technology becomes more complex and customer workload specific, machine learning (ML) models are being considered for implementation in data storage devices to provide improved performance and device characteristics. Examples of ML models that might be implemented in a data storage device, e.g., within firmware of the device, include host input/output (I/O) pattern prediction models for intelligent data relocation management or for enhancing storage device bandwidth uniformity. It would be desirable to provide improvements in storing ML models within data storage devices while providing access to the ML models by customers via host computers.

SUMMARY

The following presents a simplified summary of some aspects of the disclosure to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes a memory configured to store a plurality of machine learning (ML) models and corresponding customer digital certificates. The data storage device also includes a data storage controller including one or more processors configured, individually or collectively, to: receive, from a customer host computer, a customer digital certificate corresponding to one of the plurality of ML models stored in the memory of the data storage device; retrieve the ML model that corresponds to the customer digital certificate from the memory; load the retrieved ML model into a processing component; and process customer data using information obtained from the machine learning model loaded into the processing component. The processing component may be, for example, a firmware processing device of the data storage device or a processing device within the customer host computer.

Another embodiment of the disclosure provides a method for use by a data storage controller of a data storage device. The method includes: receiving a customer digital certificate from a customer host computer corresponding to one of a plurality of ML models stored in a memory of the data storage device along with corresponding customer digital certificates; retrieving the ML model that corresponds to the customer digital certificate from the memory; loading the retrieved ML model into a processing component; and processing customer data using information obtained from the machine learning model loaded into the processing component.

Yet another embodiment of the disclosure provides an apparatus for use with a data storage device. The apparatus includes: means for receiving a customer digital certificate from a customer host computer corresponding to one of a plurality of ML models stored in a memory of the data storage device along with corresponding customer digital certificates; means for retrieving the ML model that corresponds to the customer digital certificate from the memory; means for loading the retrieved ML model into a processing component; and means for processing customer data using information obtained from the machine learning model loaded into the processing component.

BRIEF DESCRIPTION OF THE DRAWINGS

FIG. 3 illustrates an exemplary procedure according to aspects of the present disclosure for authenticating customer access to (non-updatable) ML models.

FIG. 4 illustrates an exemplary procedure according to aspects of the present disclosure for authenticating a customer to modify/replace an updatable ML model.

FIG. 5 illustrates an exemplary procedure according to aspects of the present disclosure for modifying/replacing an updatable ML model with a customer ML model.

FIG. 7 illustrates an exemplary procedure according to aspects of the present disclosure for using a secure enclave within a host computer to run ML models.

FIG. 9 is a schematic block diagram configuration for a data storage device configured for use with ML models, according to aspects of the present disclosure.

FIG. 10 illustrates an exemplary procedure according to aspects of the present disclosure for using ML models.

DETAILED DESCRIPTION

Figure 1:
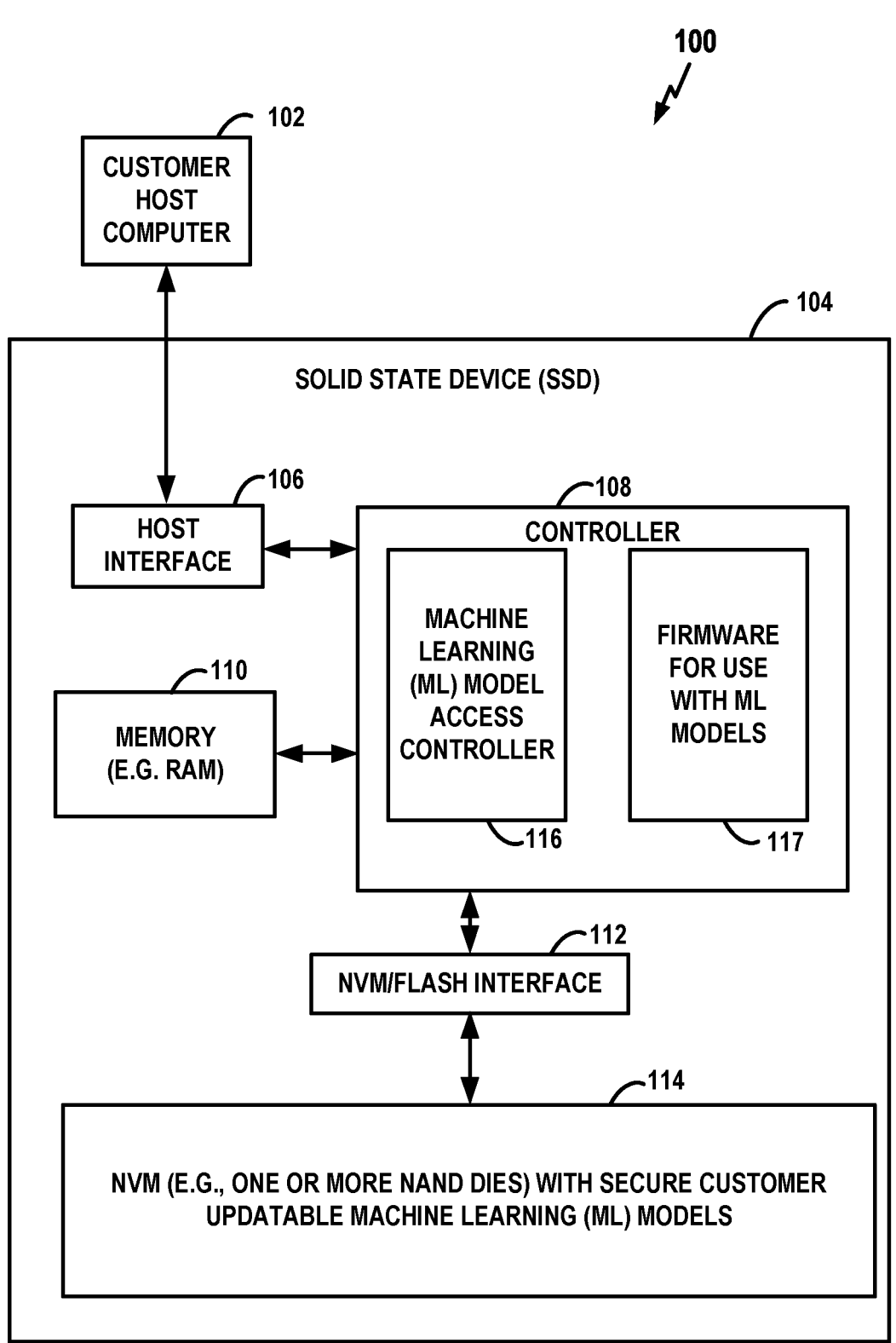
FIG. 1 is a schematic block diagram configuration for an exemplary solid state device (SSD) having a non-volatile memory (NVM) configured for storing machine learning (ML models) and related ML model information, according to aspects of the present disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Some aspects herein relate to data storage devices (DSD) having non-volatile memory (NVM), such as hard disk drives (HDDs) or solid-state devices (SSDs), e.g., NAND flash memory storage devices (herein "NANDs"). (A NAND is a type of non-volatile storage technology that does not require power to retain data. It exploits negative-AND, i.e., NAND, logic.) Other aspects relate to data storage controllers for controlling DSDs, such as the data storage controller of an SSD. To provide a concrete example, an SSD having one or more NVM NAND dies will be used below in the description of various embodiments. It is understood that at least some aspects described herein may be applicable to other forms of SSDs as well. For example, at least some aspects described herein may be applicable to phase-change memory (PCM) arrays, magneto-resistive random access memory (MRAM) arrays, and resistive random access memory (ReRAM) arrays. Features may be implemented within a CMOS direct bonded (CBA) NAND chip or die (wherein CMOS refers to a complementary metal-oxide-semiconductor). Features may also be implemented within 3D XPoint memory cores, ferroelectric random-access memory (FeRAM) cores, and other types of memory cores. In some embodiments, one or more of the memory modules or portions thereof may be configured as other types of storage class memory (SCM). Generally speaking, the memory modules may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

In addition to data storage devices, the NVM arrays (and associated circuitry and latches, where appropriate) in various described embodiments may be implemented as part of memory devices such as dual in-line memory modules (DIMMs) or other types of memory components/modules in some embodiments. Such memory devices may be accessible to a processing component such as a Central Processing Unit (CPU) or a Graphical Processing Unit (GPU). The links between processing components and such memory devices may be provided via one or more memory or system buses, including via interconnects such as Compute Express Link (CXL), Gen-Z, OpenCAPI, NVLink/NVSwitch, Infinity Fabric, Omni-Path, and other similar interconnect protocols. In other embodiments, the links between processing components and memory devices may be provided via on-die or die-to-die interconnects. In certain embodiments, the NVM arrays and associated circuitry may be co-located on the same die as the processing components such as CPU or GPU. In other examples, data may be stored in HDDs, tape drives, hybrid drives, etc.

Overview

As noted above, as storage device technology becomes more complex and customer workload specific, machine learning (ML) models are being considered for implementation in data storage devices using, e.g., firmware (FW), to provide improved performance and device characteristics. ML models that can be implemented in firmware include host input/output (I/O) pattern prediction for intelligent data relocation management or for enhancing storage device bandwidth uniformity. I/O pattern prediction can be used, for example, to pre-fetch data from a memory by predicting logical block addresses (LBAs) to expedite I/O and improve overall bandwidth. Data relocation generally refers to the relocation of data within a DSD and can include such operations as garbage collection, dynamic wear leveling, folding operations, flush operations, etc., to consolidate, free, or relocate storage space within the memory. Such operations can be time-consuming and so intelligent processing procedures may be implemented to expedite the operations. In particular, ML models may be used to optimize I/O pattern recognition to expedite prefetch and data relocation and improve bandwidth uniformity.

Optimization can be especially important within data centers used for cloud storage where many thousands of DSDs may be employed, each storing a terabyte (TB) or more data. In such cloud storage systems, customer host computers access the many DSDs. Often, different customers maintaining cloud storage have different data storage needs, so ML models optimized for one customer may not be optimal for another customer.

Herein, improvements are provided for storing ML models within data storage devices and for providing access to the ML models to customers via host computers. In some aspects, a procedure is provided for use with a DSD that includes a memory configured for storing a set of ML models and corresponding customer digital certificates. The procedure may include: receiving a customer digital certificate from a customer host computer corresponding to one of the set of ML models; retrieving the machine learning model that corresponds to the customer digital certificate from the memory; loading the retrieved machine learning model into a processing component; and processing customer data using information obtained from the machine learning model loaded into the processing component. In other aspects, a data storage device, a data storage system, or a data storage apparatus is provided.

Herein, processing customer data using information obtained from an ML model can include, e.g., reading/writing data from/to the memory of the DSD while exploiting information provided by the ML model, such as information provided to optimize the prefetching of data and/or to intelligently relocate data within the memory (as part of garbage collection, wear leveling, etc.). In other examples, ML models may be used to improve or optimize setting read voltages and the like. In still other examples, the ML models may pertain to image recognition or other artificial intelligence (AI) functions. These are just a few data processing examples. The ML models may be pre-trained models for use by firmware components of the DSD. However, the ML models can be designed and used for any purpose.

Using the techniques described herein, an original equipment manufacturer (OEM) may provide DSDs that each have a set of different ML models for use with DSD firmware that offer different optimizations to address different storage needs. Customers may access particular ML models via their customer host computers using their digital certificates to load ML models that fit their needs. Each DSD may provide dozens of different default ML models for customers to choose from. Moreover, in some examples, customers may modify or replace particular ML models to better serve their needs. Procedures described herein provide a secure framework to enable customers to update/configure specific ML models for differentiated product enhancement. In some aspects, the OEM may charge fees to allow customers to update one or more ML models. In addition to storing the ML models, the DSD may store lists of customers and their IDs, corresponding digital certificates with public keys, and lists of ML models that each customer is allowed to access and/or substitute with their own ML model. Thus, in some aspects, the systems and procedures described herein provide a framework to enable customers to update or configure specific ML models in OEM storage devices. This also provides a framework for allowing an OEM to monetize various ML model-based features.

In some aspects, the ML models are configured to optimize data relocation. The data storage controller of the DSD is configured to intelligently relocate data based on information obtained using a selected ML model. In some aspects, the ML models are configured to optimize data prefetch. The data storage controller of the DSD is configured to prefetch customer data using information obtained from a selected prefetch ML model to intelligently prefetch the data. This may, e.g., be used to improve or optimize bandwidth uniformity across multiple DSDs.

In some aspects, the ML models are stored within a dedicated zone of physical blocks or meta-blocks within the memory of the DSD along with corresponding public key/ private key information or other cryptographic key information. In some aspects, two or more ML models may be provided that are configured for different workloads (e.g., usage patterns) or applications. The data storage controller processes the customer data using a particular ML model selected and/or loaded based on workload or application.

In some aspects, the data storage controller is configured to modify or replace an ML model based on instructions received from the customer host computer. For example, a default model provided by an OEM may be replaced by a customer-provided model. In some examples, the customer host computer provides a bitmap of a replacement ML model to replace a default OEM ML model. The data storage controller may be configured to verify the customer-provided ML model before replacing the default ML model. This may be done, for example, by running the customer-provided ML model in a sandbox mode while detecting any out-of-range outputs from the customer-provided ML model.

As some ML models may be too large to run efficiently within the processors of the data storage controller, procedures are described herein to enable a copy of an ML model to be transferred from the DSD into a secure enclave of the customer host computer for execution therein. Secure enclave execution information may be sent to the customer host computer along with the copy of the ML model to enable execution of the transferable ML model within the secure enclave within the host computer. The data storage controller may verify the integrity of the secure enclave, for example, by: requesting the secure enclave to calculate a current hash value for the transferred ML model; receiving a calculated hash value from the enclave and a digital certificate signed with a customer private key; and then verifying the integrity of the of the secure enclave based on the calculated hash value and the digital certificate. In this manner, the secure enclave can provide a trusted environment for ML model execution. The secure enclave may be configured, for example, in accordance with Software Guard Extensions (SGX) of Intel™ or Secure Encrypted Virtualization (SEV) of AMD™.

Insofar as the ML models are concerned, existing ML frameworks such as TensorFlow enable the training of ML models/predictors on massive datasets in powerful machines. The trained models are then output as a pre-trained binary file (where, e.g., the binary file contains meta info such as the ML algorithm, model parameters, etc.). These pre-trained binary files or "binaries" can be loaded and used elsewhere, even in a relatively resource-constrained environment, such as within the processor of a data storage controller. TensorFlow is a free and open-source software library for ML and AI. TensorFlow has a C-based interface, which is a common programming language used for firmware development and hence is well-suited for use with SSD firmware. TensorFlow and related technologies thus allow for the relatively fast and wide adoption of ML in many platforms.

Thus, in various aspects, one or more of the following features are provided:

Dedicated zone/physical block/meta-blocks for trained ML models in data storage devices. The DSD stores pre-trained ML models used by various firmware modules. The DSD may store additional information such as lists of subscribed customers with IDs, their digital certificates with public keys, and a list of models each customer is allowed to substitute with their own.

Secure mechanisms using a customer digital certificate for customers to substitute OEM pre-trained ML models with customer (e.g. in-house) ML models for improved performance and customization for specific workloads.

Secure mechanisms/flows leveraging SGX/SEV secure enclave technology and customer digital certificates, which allows resource-intensive ML models to be executed in host memory instead of the DSD with outputs then shared to the DSD.

Exemplary SSD with Secure Customer Updatable Machine Learning (ML) Models

FIG. 1 is a block diagram of a system 100 including an exemplary SSD (or computational storage device (CSD)) having an NVM configured for storing ML models (some of which may be updated by customers in accordance with aspects of the disclosure) and related ML model information. The NVM may also store customer data and other data as well.

System 100 includes a customer host computer 102 and an SSD 104 coupled to the customer host computer 102. The customer host computer 102 provides commands to the SSD 104 for transferring data between the customer host computer 102 and the SSD 104. For example, the customer host computer 102 may provide a write command to the SSD 104 for writing user data to the SSD 104 or a read command to the SSD 104 for reading user data from the SSD 104. The customer host computer 102 may be any system or device having a need for data storage or retrieval and a compatible interface for communicating with the SSD 104. For example, the customer host computer 102 may be a computing device, a personal computer, a portable computer, a workstation, a server, a personal digital assistant, a digital camera, or a digital phone as merely a few examples. Additionally or alternatively, the customer host computer 102 may be a system or device having a need for image processing, such as computer vision for use in self-driving vehicles, natural language processing, or other types of object-oriented processing. In some examples, the customer host computer 102 is a server in a cloud computing storage system having many DSDs for storing vast amounts of data.

The SSD 104 includes a host interface 106, a controller 108, a memory 110 (such as random access memory (RAM)), an NVM interface 112 (which may be referred to as a flash interface), and an NVM 114, such as one or more NVM NAND dies. Controller 108 may be configured with an ML model access controller 116 that controls access to ML models stored on the NVM 114 to allow a customer to securely access and update one or more of the ML models. The controller 108 also may be configured with firmware 117 for use with the ML models, e.g., firmware configured to operate using trained ML models retrieved from the NVM 114. For example, the ML models may be configured to optimize or otherwise improve data relocation management and/or prefetching to achieve bandwidth uniformity. The NVM 114 may be configured to store the ML models and other data, such as customer digital certificates, IDs, public keys, etc., as well as customer data such as user information. The firmware 117 is one example of a processing component of the SSD. Other examples of processing components into which an ML model may be loaded include hardware or software processing devices of the SSD. Still further, as will be explained below, an ML may be loaded into a processing component of the customer host computer 102 for execution within a secure enclave therein. A processing component, as the term is used herein, can correspond to any suitable processing device or circuit into which an ML model may be loaded and may be, e.g., a component of the data storage controller, the customer host computer, or other system or device.

The host interface 106 is coupled to the controller 108 and facilitates communication between the customer host computer 102 and the controller 108. The controller 108 is coupled to the memory 110 as well as to the NVM 114 via the NVM interface 112. The host interface 106 may be any suitable communication interface, such as a Non-Volatile Memory Express (NVMe) interface, a Universal Serial Bus (USB) interface, a Serial Peripheral (SP) interface, an Advanced Technology Attachment (ATA) or Serial Advanced Technology Attachment (SATA) interface, a Serial Attached Small Computer System Interface (SCSI) (SAS), an IEEE 1394 (Firewire) interface, or the like. In some embodiments, the customer host computer 102 includes the SSD 104. In other embodiments, the SSD 104 is remote from the customer host computer 102 or is contained in a remote computing system communicatively coupled with the customer host computer 102. For example, the customer host computer 102 may communicate with SSD 104 through a wireless communication link. Links between the host and the SSD may also be provided via one or more memory or system buses, including via intercon- nects such h as Compute Express Link (CXL), Gen-Z, OpenCAPI, NVLink/NVSwitch, Infinity Fabric, Omni-Path, and other similar interconnect protocols.

Controller 108 controls the operation of the SSD 104. In various aspects, the controller 108 receives commands from the customer host computer 102 through the host interface 106 and performs the commands to transfer data between the customer host computer 102 and the NVM 114. Further- more, the controller 108 may manage reading from and writing to memory 110 for performing the various functions effected by the controller and to maintain and manage cached information stored in memory 110. The ML model access controller 116 of the controller 108 may manage access to the ML models on behalf of the customer to, e.g., permit replacing or updating at least some of the ML models to serve the needs of the customer, by, e.g., using particular ML models trained for use in predicting LBAs for prefetch or for controlling data relocation, such as garbage collection and wear leveling. The ML model access controller 108 also controls the transfer of any transferable ML models from the SSD 104 to a secure processing enclave (not shown in FIG. 1) within the customer host computer 102.

The controller 108 may include any type of processing device, such as a microprocessor, a microcontroller, an embedded controller, a logic circuit, software, firmware, or the like, for controlling the operation of the SSD 104. In some aspects, some or all of the functions described herein as performed by the controller 108 may instead be per- formed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the customer host computer 102. In still further aspects, some or all of the functions described herein as being performed by the con- troller 108 may instead be performed by another element such as a controller in a hybrid drive including both non- volatile memory elements and magnetic storage elements.

The memory 110 may be any suitable memory, computing device, or system capable of storing data. For example, the memory 110 may be ordinary RAM, DRAM, double data rate (DDR) RAM (DRAM), static RAM (SRAM), synchro- nous dynamic RAM (SDRAM), flash storage, an erasable programmable read-only-memory (EPROM), an electrically erasable programmable ROM (EEPROM), or the like. In various embodiments, the controller 108 uses the memory 110, or a portion thereof, to store data during the transfer of data between the customer host computer 102 and the NVM 114. For example, the memory 110 or a portion of the memory 110 may be a cache memory. The NVM 114 receives data from the controller 108 via the NVM interface 112 and stores the data. The NVM 114 may be any suitable type of non-volatile memory, such as a NAND-type flash memory or the like.

Although FIG. 1 shows an example SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or com- ponents. For example, a processor may include, or otherwise be coupled with, embedded NVM and associated circuitry and/or components for deep learning that are described herein. The processor could, as one example, offload certain tasks to the NVM and associated circuitry and/or compo- nents. As another example, the controller 108 may be a controller in another type of device and still include the ML model access controller 116 and perform some or all of the functions described herein.

Figure 2:
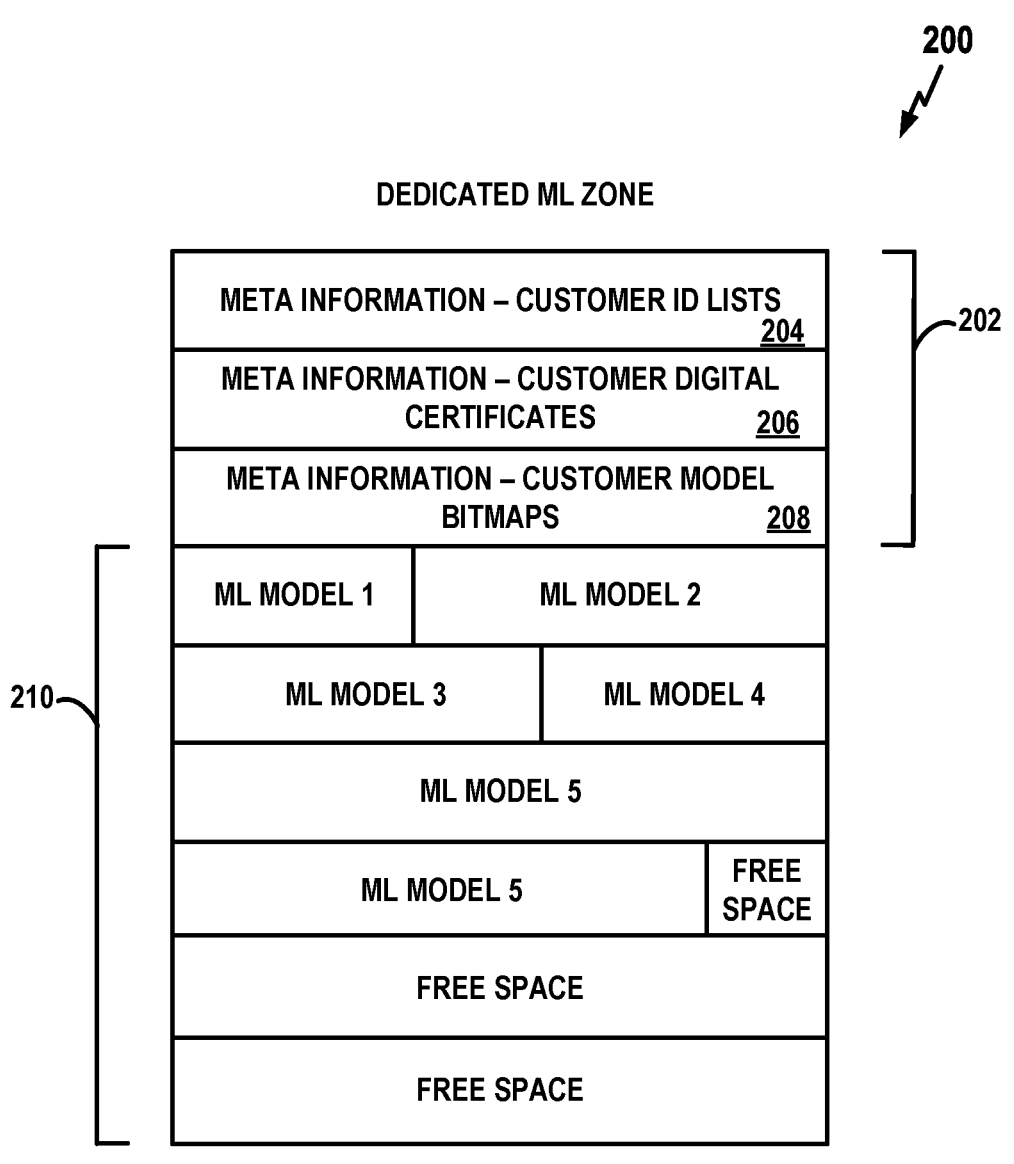
FIG. 2 illustrates an example of a dedicated ML zone within an NVM die for sorting ML models and related ML information, according to aspects of the present disclosure.

FIG. 2 is a block diagram illustrating a dedicated ML zone memory 200 of an exemplary NVM die configured, e.g., for storing ML models and related information. The dedicated ML zone 200 may consist of one or more blocks of single- level cell (SLC) memory. In the example of FIG. 2, the dedicated ML zone 200 includes a first metadata memory portion 202 devoted to storing meta information pertaining to the ML models, including customer ID lists 204, customer digital certificates 206, and model bitmaps 208 provided by customers. The bitmaps may represent all or a portion of a model that a customer is permitted to update. A portion 210 of the dedicated ML zone 200 is devoted to storing the actual ML models, some of which may be default OEM models and some of which may be customer-provided models. In this particular example, six ML models are stored, which may be of different sizes, thus consuming different amounts of storage space. In one particular example, ML models #1-4 may be default models and ML models #5-6 may be customer-provided models.

The ML model memory portion 210 also has free space for the storage of additional models. Although not shown in FIG. 2, other portions of the dedicated ML zone 200 may be provided for storing other data such as user or customer data to be processed by the ML models. Such data may include, for example, audio or video (image) data. Note that the various portions or sub-portions of the memory may be configured, e.g., as different memory zones (or sub-zones), storage blocks (or meta-blocks), or memory partitions.

In use, the ML model access controller 116 of FIG. 1 accesses information stored in the dedicated ML zone 200 of FIG. 2 to, for example, retrieve a particular ML model (e.g., ML model 4) for use with a particular customer (based on a public key and other information provided by the customer) and loads the ML model into the firmware 117 of FIG. 1 (or into volatile memory accessed by the firmware) to, e.g., exploit the ML model to predict LBAs for prefetching user data from the NVM die on behalf of the customer. Note that at least two types of ML models are supported: customer non-updatable models (i.e., only the OEM can modify them); and customer updatable models (i.e., customers may improve/differentiate their storage devices by substitution of OEM ML models with the customer's own trained ML models.

FIG. 3 illustrates a procedure 300 for authenticating customer access and/or using (non-updatable) ML models. At block 302, one or more customers subscribe to an ML model service offered by an OEM and provide digital certificates with the customer's public key to the OEM. At block 304, the OEM fabricates SSDs and then stores (flashes) the following to the SSD memory: a list of sub-scribed Customers and/or IDs; customer Digital Certificates each containing a respective public key; and lists/bitmaps of models that are accessible/usable by each respective sub-scribing customer. This information can be updated later by the OEM within SSDs that are deployed in the field by using a secure field FW update (SFFU) or similar procedures. OEM (vendor) specific commands may be used for host-device communication.

Table I illustrates ML customer information that may be stored in SSD for use in authenticating customer access to ML models. In this example, the models are assigned a number (i.e., 1 . . . . N) and the table stores the number, e.g. 3, 7, 9, etc.

TABLE I

| Customer Id | Digital Certificate Number | Accessible Models List/Bitmap |
| --- | --- | --- |
| 065 | 555 | 3, 7, 9 |
| . . . | . . . | . . . |

Later, at block 306, after the SSD has been installed in a customer's host computer, the customer requests (via the host computer) to access or use specific model(s) by sending the customer's ID and digital signature signed using its private key. At block 308, the SSD controller retrieves the public certificate for the corresponding customer ID from the stored information and verifies the customer, then retrieves and loads the accessible ML model(s) for that customer. The ML model may be loaded, e.g., into a volatile memory of the SSD for use by firmware and or may be loaded into the firmware itself. During use, at block 310, the customer's host computer sends commands to access the SSD to, e.g., (a) retrieve stored data using a pre-fetch procedure that exploits the ML model(s) to provide opti-mized LBA predictions or (b) relocate data (e.g., perform garbage collection, wear leveling, flush operations, or fold operations) using the ML model(s) optimized for relocation. Note that a fold is a data relocation operation that involves reading data from several SLC wordlines of an NVM and storing the data in a multi-level cell (MLC) of the NVM. For example, three wordlines of data in SLC memory can be folded into one wordline of triple-level cell (TLC) memory. Four wordlines of SLC memory can be folded into one wordline of quad-level cell (QLC) memory.

Some of the ML models may be selected or used based on the current workload or the current application. For example, one or more workload thresholds may be set so that a current workload metric may be compared against the threshold(s) to determine which ML model(s) to use. For instance, the workload metric may represent a read/write ratio. One ML model may be optimized for use with a read/write ratio of 70/30, whereas another is optimized for use with a read/write ratio of 90/10. A read/write ratio threshold may be set, e.g., to 80/20 so that if the read/write ratio exceeds the threshold (e.g., R>80/W<20), a first ML model is used; otherwise, a second ML model is used. As far as applications are concerned, one ML model may be optimized for use with an application that retrieves video/audio data and another ML model may be optimized for use with an application that retrieves audio-only data. The particular ML model may be selected for use based on the current application.

Note that, in some examples, a customer may be permit-ted to use any of the available ML models in the SSD and, in such an embodiment submission of digital certificates/public keys, etc. is not required to use or access the ML models. In some embodiments, submission of digital cer-tificates/public keys, etc. is thus required only if the cus-tomer wishes to modify a model, which is discussed in connection with FIGS. 4 and 5.

FIG. 4 illustrates a procedure 400 for use authenticating a customer to modify updatable ML models. At block 402, one or more customers subscribe to a configurable ML model service offered by an OEM and provide digital certificates with the customer's public key to the OEM. At block 404, the OEM fabricates SSDs and then stores (flashes) to the SSD memory the following: a list of sub-scribed Customers and/or IDs; customer Digital Certificates each containing a respective public key; and lists/bitmaps of allowed models that are updatable by each subscribing customer. This information can be updated later by the OEM within SSDs that are deployed in the field by using SFFU or similar procedures.

Table II illustrates ML customer information that may be stored in SSD for use in authenticating a customer to modify or update an ML model. The models are again assigned a number (i.e., 1 . . . . N) and the table stores the number. In this particular example, although the customer may access and use three different ML models (see, Table I), the customer is permitted to modify or update only two of the models, e.g., Models 3 and 7.

TABLE II

| Customer Id | Digital Certificate Number | Updateable Models List/Bitmap |
| --- | --- | --- |
| 065 | 555 | 3, 7 |
| . . . | . . . | . . . |

Later, at block 406, after the SSD has been installed in a customer's host computer, the customer requests (via the host computer) to update a specific model by sending the customer's ID and digital signature signed using its Private Key. At block 408, the SSD controller (e.g., its firmware) retrieves the public certificate for the corresponding cus-tomer ID from the stored information and verifies the customer, then loads a list of modifiable models for that customer. As discussed above, a similar procedure may be used to allow a customer to access and use ML models, even if those models are not updateable. For example, the lists stored for each customer may additionally or alternatively list customer non-updatable models, and the customer may be required to provide IDs/keys to access and use those models.

FIG. 5 illustrates a procedure 500 for updating or modifying an ML model on behalf of a customer. At block 502, a customer's host computer queries the SSD (e.g., providing ID and public key) and receives a list of allowed updatable models, along with information specifying compatibility parameters for the models to run using the FW of the SSD. Table III provides an exemplary list of parameters or other information that may be used to specify the parameters of compatible models, such as the input parameters the model requires, the output parameters the model generates, a maximum acceptable model size, etc. The input and output parameters may specify, for example, the number of parameters permitted or required by a compatible ML model and their ranges and types. In an illustrative example, the parameters may specify that a compatible ML model uses N weights and M different biases, where N=20 and N=5. The parameters may further specify the acceptable ranges of the values, e.g., weights must be between 0 and 100, and may specify whether integers or floating point values are required and/or permitted. The sizes of any input or output vectors may be specified. If TensorFlow is used to generate the ML models, TensorFlow parameters may be used to specify at least some of the compatibility parameters.

TABLE III

| Model Id | Model Type | Model Params | Input Params | Output Params | Model Version | Model Active? |
|---|---|---|---|---|---|---|
| . . . | . . . | . . . | . . . | . . . | . . . | . . . |
| . . . | . . . | . . . | . . . | . . . | . . . | . . . |

At block 504, the customer's host computer sends to the SSD a replacement model binary along with the model ID. At block 506, the SSD enters a sandbox mode to run the customer model to verify model correctness by, for example, detecting out-of-range outputs from the customer-provided model. (A sandbox is an isolated testing environment that enables a processor to run a program without otherwise affecting the processor.) In the sandbox mode, if the updated model provides out-of-range outputs, the outputs are clipped (to either a corresponding maxima or minima) to prevent the SSD from entering an erroneous state due to an incorrect model. At block 508, if there is an error in the sandbox mode, a suitable error message is sent to the host computer, and the model is not accepted as a replacement for a default OEM model. At block 510, if there are no errors in sandbox mode, the model is updated (e.g., the model is stored in the dedicated ML zone described above). In some examples, a customer may store multiple versions of a model of the same ID. The customer's host computer sends commands to the SSD to activate a specific model version based, e.g., on the workload/application that is currently running.

Note that, in a typical scenario, engineers working for a customer corporation may design, test, and debug their ML models before attempting to install them in an OEM SSD. As such, the verification procedure of FIG. 5 may represent a final verification step to ensure that the resulting ML model is compatible. Note the compatibility information in Table III may also be provided to the customer via SSD instruction manuals, data sheets, etc. to facilitate the design of compatible ML models. In some cases, the engineers for customer corporations may work closely with the engineers of the OEM to facilitate compatible ML model design.

Figure 6:
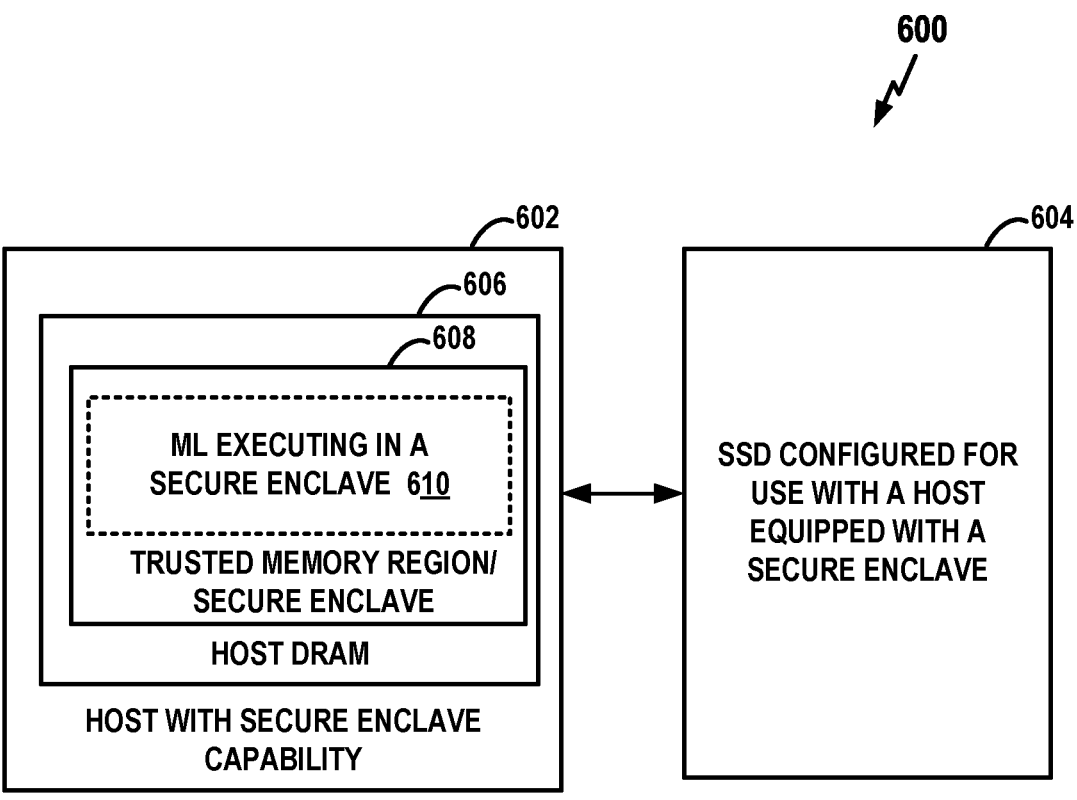
FIG. 6 is a schematic block diagram configuration for a computing system according to aspects of the present disclosure having a host computer with a secure enclave and an SSD configured for loading ML models into the secure enclave.

FIG. 6 illustrates a system 600 configured to run a model within a secure enclave of a host computer, rather than in a processor of the SSD. System 600 includes a host computer 602 configured to provide a secure enclave, and an SSD 604 configured for use with a host equipped with a secure enclave. The host computer 602 has host DRAM 606, which includes a trusted memory region/secure enclave 608 configured using secure enclave technology (such as SGX of Intel™ and SEV of AMD™). An ML 610 is shown executing within the trusted memory region/secure enclave 608. Note that the ML model may be encrypted for transference into the secure enclave and then decrypted for execution within the enclave.

In this regard, an SSD might not have the computational resources to execute a large resource-intensive ML model in the SSD itself. System 600 allows execution in the host memory using host computation resources. For example, the host and the SSD can be configured so the customer host may retrieve one or more of its allowed model(s) from the dedicated ML zone of the SSD (e.g., at SSD initialization time) and load the models into the secure enclave within the host. The host then executes the model(s) and shares the results (e.g., LBA predictions) with the SSD, which can be used by the relevant FW module of the SSD for optimization (e.g., optimizing pre-fetch). Note that in a controlled environment, such as a data center, an OEM trusted client can provide a secure environment to load and run OEM-supplied models in the host computer without the need for a secure enclave. However, execution of OEM-supplied models elsewhere (such as in retail hosts) presents a security challenge as the models can be tampered with by unauthorized software, potentially leading to storage device unwanted behavior or device corruption. Hence, secure enclave technology (such as SGX of Intel™ and SEV of AMD™) may be used to provide a secure storage device-controlled environment for model execution in host memory, as shown in FIG. 6

FIG. 7 illustrates a procedure 700 for using a secure enclave. At block 702, during the initialization of the SSD, the SSD transfers one or more ML models into the secure enclave of the customer's host computer. At block 704, during use, the customer's host computer sends commands to access the SSD to, for example, retrieve stored data using a pre-fetch procedure that exploits an ML model to provide optimized LBA predictions or to relocate data (e.g., perform garbage collection, wear leveling, flush operations, or fold operations) using the ML model optimize the relocation. At block 706, the SSD responds to the host commands by sending suitable information and/or instructions to the secure enclave to run the ML model in the secure enclave of the host while, e.g., exploiting the prefetch predictions made by the model during the retrieval of the requested data. The particular instructions/information sent to the secure enclave may depend, for example, on the particular secure enclave (e.g., SGX or SEV) and may include the data to be processed such as LBAs, etc. At block 708, the SSD controller verifies the enclave and the ML model by requesting (e.g., periodically or at random) that the enclave calculate a current hash value of the model for comparison against a pre-stored hash value maintained in the SSD. At block 710, the secure enclave of the host computer sends the calculated hash to the SSD along with a digital certificate signed with the customer's private key, and the SSD checks the integrity by using the hash and the customer's public key, and, if verified, attests to the integrity of the secure enclave.

Exemplary Apparatus including Data Storage Controller and NVM Array

Figure 8:
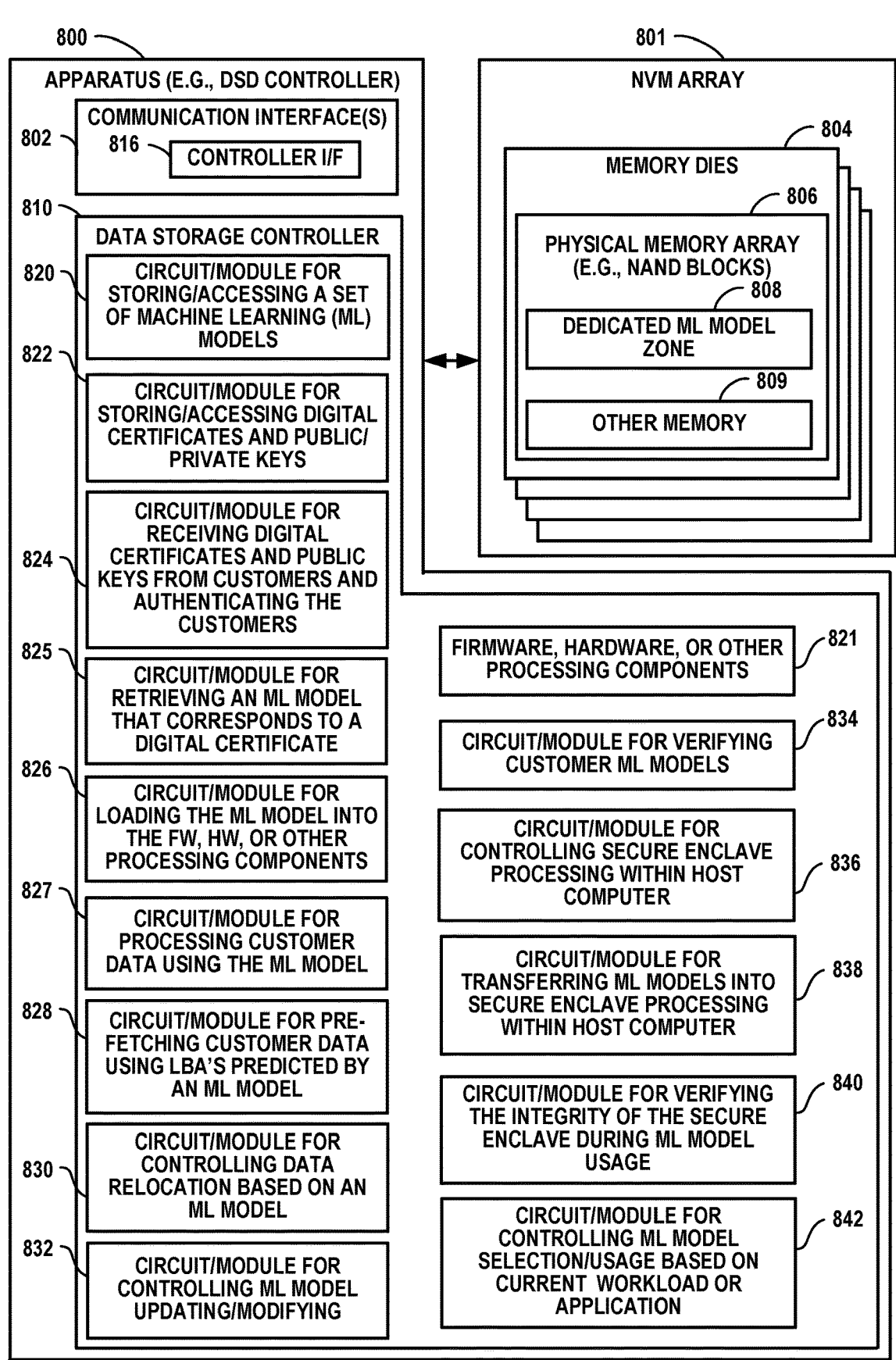
FIG. 8 is a schematic block diagram configuration for an exemplary apparatus, such as an SSD, configured for retrieving ML models from memory using a customer certificate and for processing customer data using ML models according to aspects of the present disclosure.

FIG. 8 illustrates an embodiment of an apparatus 800 configured according to one or more aspects of the disclosure. The apparatus 800, or components thereof, could embody or be implemented within a data storage device (DSD) or other type of device that supports computations and data storage. In various implementations, the apparatus 800, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes, or uses data. In some examples, the device is coupled to a server in a cloud computing storage system having many DSDs for storing vast amounts of data.

The apparatus 800 is communicatively coupled to an NVM die array 801 that includes one or more memory dies 804, each of which may include physical memory arrays 806, e.g., NAND blocks. The physical memory array 806 may include a dedicated ML zone 808 (such as in FIG. 6) for storing ML models and meta-information, and other memory 809, e.g., for storing user or customer data. In some examples, the memory dies may include on-chip computational circuitry such as under-the-array circuitry. The memory dies 804 may be communicatively coupled to the apparatus 800 such that the apparatus 800 can read or sense information from, and write or program information to, the physical memory array 806. That is, the physical memory array 806 can be coupled to circuits of apparatus 800 so that the physical memory array 806 is accessible by the circuits of apparatus 800. The dies may additionally include, e.g., input/output components, registers, voltage regulators, etc. The connection between the apparatus 800 and the memory dies 804 of the NVM die array 801 may include, for example, one or more busses.

The apparatus 800 includes a communication interface 802 and a data storage controller 810, which may include various modules/circuits, including firmware (FW) components. These components can be coupled to and/or placed in electrical communication with one another and with the NVM die array 801 via suitable components, represented generally by connection lines in FIG. 8. Although not shown, other circuits such as timing sources, peripherals, voltage regulators, and power management circuits may be provided, which are well known in the art, and therefore, will not be described any further.

The communication interface 802 provides a means for communicating with other apparatuses over a transmission medium. In some implementations, the communication interface 802 includes circuitry and/or programming (e.g., a program) adapted to facilitate the communication of information bi-directionally with respect to one or more devices in a system. In some implementations, the communication interface 802 may be configured for wire-based communication. For example, the communication interface 802 could be a bus interface, a send/receive interface, or some other type of signal interface including circuitry for outputting and/or obtaining signals (e.g., signals to/from a host). The communication interface 802 serves as one example of a means for receiving and/or a means for transmitting.

The modules/circuits of the data storage controller 810 are arranged or configured to obtain, process, and/or send data, control data access and storage, issue or respond to commands, and control other desired operations. For example, the modules/circuits 810 may be implemented as one or more processors, one or more controllers, and/or other structures configured to perform functions. According to one or more aspects of the disclosure, the modules/circuits 810 may be adapted to perform any or all of the features, processes, functions, operations, and/or routines described herein as being performed by the data storage controller. For example, the modules/circuits 810 may be configured to perform any of the data storage controller steps, functions, and/or processes described with respect to FIGS. 1-7 and 9-10, discussed below.

As used herein, the term "adapted" in relation to the processing modules/circuits 810 may refer to the modules/circuits being one or more of configured, employed, implemented, and/or programmed to perform a particular process, function, operation and/or routine according to various features described herein. The modules/circuits may include a specialized processor, such as an application-specific integrated circuit (ASIC) that serves as a means for (e.g., structure for) carrying out any one of the data storage controller operations described in conjunction with, e.g., FIGS. 1-7 and 9-10. The modules/circuits serve as an example of a means for processing. In various implementations, the modules/circuits may provide and/or incorporate, at least in part, functionality described above for the components in various embodiments shown, including for example controller 108 of FIG. 1.

According to at least one example of the apparatus 800, the processing modules/circuits 810 may include one or more of: a circuit/module 820 for storing/accessing a set of machine learning (ML) models (as in FIG. 3); firmware (FW), hardware (HW), or other processing components/circuits 821; a circuit/module 822 for storing/accessing digital certificates and public/private keys (as in FIG. 3); a circuit/module 824 for receiving digital certificates and public keys from customers and authenticating the customers (as in FIG. 3); a circuit/module 825 for retrieving an ML model that corresponds to a digital certificate (as in FIG. 3); a circuit/module 826 for loading the ML model into the FW, HW, or other processing components or processing circuits 821 (as in FIG. 3) or into a processing component within a customer host computer; a circuit/module 827 for processing customer data using information obtained from the ML model loaded into the processing component 821 (as in FIG. 3), which may include a wide variety of processing procedures depending up on the particular application; a circuit/module 828 for pre-fetching customer data using LBAs predicted by an ML model (as in FIG. 3); a circuit/module 830 for controlling data relocation based on an ML model (as in FIG. 3); a circuit/module 832 for controlling ML model updating/modifying (as in FIGS. 4-5); a circuit/module 834 for verifying customer ML models (as in FIGS. 4-5); a circuit/module 836 for controlling secure enclave processing within host computer (as in FIGS. 6-7); a circuit/module 838 for transferring ML models into secure enclave processing within host computer (as in FIGS. 6-7); a circuit/module 840 for verifying the integrity of the secure enclave during ML model usage (as in FIGS. 6-7); and a circuit/module 842 for controlling ML model selection/usage based on current workload or application (as in FIG. 3). Note that block 821 provides examples of processing components or processing circuits of the DSD into which an ML model may be loaded. Other examples of processing components into which an ML model may be loaded include processing components of the customer host computer 102 of FIG. 1, e.g., for execution within a secure enclave therein. See, for example, FIG. 6.

In at least some examples, means may be provided for performing the functions illustrated in FIG. 8 and/or other functions illustrated or described herein. For example, the means may include one or more of: means, such as circuit/module 820, for storing/accessing a set of machine learning (ML) models (as in FIG. 3); means, such as circuit/module 822, for storing/accessing digital certificates and public/private keys (as in FIG. 3); means, such as circuit/module 824, for receiving digital certificates and public keys from customers and authenticating the customers; means, such as circuit/module 825, for retrieving an ML model that corresponds to a digital certificate (as in FIG. 3); means, such as circuit/module 826, for loading the ML model into firmware of other processing components (as in FIG. 3); means, such as circuit/module 827, for processing customer data using information obtained from the ML model loaded into the processing component (as in FIG. 3); means, such as circuit/module 828, for pre-fetching customer data using LBAs predicted by an ML model (as in FIG. 3); means, such as circuit/module 830, for controlling data relocation based on an ML model (as in FIG. 3); means, such as circuit/module 832, for controlling ML model updating/modifying (as in FIGS. 4-5); means, such as circuit/module 834, for verifying customer ML models (as in FIGS. 4-5); means, such as circuit/module 836, for controlling secure enclave processing within host computer (as in FIGS. 6-7); means, such as circuit/module 838, for transferring ML models into secure enclave processing within host computer (as in FIGS. 6-7); means, such as circuit/module 840, for verifying the integrity of the secure enclave during ML model usage (as in FIGS. 6-7); and means, such as circuit/module 842, for controlling ML model selection/usage based on current workload or application (as in FIG. 3).

In yet another aspect of the disclosure, a non-transitory computer-readable medium is provided that has one or more instructions which when executed by a processing circuit in a DSD controller causes the controller to perform one or more of the data storage controller functions or operations listed above.

Additional Exemplary Methods and Embodiments

FIG. 9 is a block diagram of an exemplary data storage device 900 in accordance with some aspects of the disclosure. The data storage device 900 includes: a memory 902 configured to store a set of machine learning (ML) models and corresponding customer digital certificates; and a data storage controller 904 that is coupled to the memory 902 and has a processing circuit or one or more processors configured, individually or collectively, to: receive, from a customer host computer, a customer digital certificate from a customer host computer corresponding to one of the set of ML models stored in the memory of the data storage device; retrieve the ML model that corresponds to the customer digital certificate from the memory (or retrieve two or more ML models) that corresponds to the certificate, if requested by the customer); load the retrieved machine learning model into a processing component; and process customer data using information obtained from the machine learning model loaded into the processing component.

The data storage controller 904 can receive other information as well, such as private keys, IDs, bitmaps, etc., as explained above. The ML model may be loaded, e.g., into firmware or other processing components (or volatile memory) of the data storage device. In other examples, the ML model may be loaded into a processor (or volatile memory) of the host computer, such as a processor (or volatile memory) within a secure enclave of the host computer. The information obtained from the ML model may be, e.g., model predictions. The processing of the customer data may include, for example, retrieving customer data from NVM using pre-fetch optimized based on predictions made by an ML model or performing NVM data relocation (e.g., wear leveling, etc.) based on information from an ML model to optimize bandwidth uniformity or to provide a wide range of other data processing functions. The processing of customer data can include processing data based on information obtained from an ML model that has been transferred into a secure enclave within a host computer.

FIG. 10 illustrates a method or process 1000 in accordance with some aspects of the disclosure for use by a data storage controller of a data storage device. At block 1002, the data storage controller receives a customer digital certificate from a customer host computer corresponding to one of a set of machine learning models stored in the memory of the data storage device along with corresponding customer digital certificates. At block 1004, the data storage controller retrieves the ML model (or one or more ML models) that corresponds to the customer digital certificate from the memory. At block 1006, the data storage controller loads the retrieved ML model into a processing component. At block 1008, the data storage controller processes customer data using information obtained from the machine learning model loaded into the processing component. The processing of the customer data may include, for example, controlling one or more device functions using the information obtained from the machine learning model, such as controlling one or more hardware device operations to change a physical state of the data storage controller or some other device.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. See, also, 3D XPoint (3DXP)) memories. Each type of memory device may have different configurations. For example, flash memory devices may be configured in a NAND or a NOR configuration.

Regarding the application of the features described herein to other memories besides NAND: NOR, 3DXP, PCM, and ReRAM have page-based architectures and programming processes that usually require operations such as shifts, XORs, ANDs, etc. If such devices do not already have latches (or their equivalents), latches can be added to support the latch-based operations described herein. Note also that latches can have a small footprint relative to the size of a memory array as one latch can connect to many thousands of cells, and hence adding latches does not typically require much circuit space.

The memory devices can be formed from passive and/or active elements, in any combination. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bitline and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bitlines and word lines.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the z direction) with each column having multiple memory elements in each column. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of a non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements that span through multiple memory levels. Three-dimensional memory arrays may also be designed in a NOR configuration and a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but covers all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/ or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer-readable medium having stored thereon computer-executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application-specific integrated circuits. In addition, a computer-readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
a memory configured to store a plurality of machine learning models and corresponding customer digital certificates each comprising respective cryptographic key information; and
a data storage controller comprising one or more processors configured, individually or collectively, to:
receive, from a customer host computer, a customer digital certificate comprising respective cryptographic key information and corresponding to one of the plurality of machine learning models stored in the memory of the data storage device;
retrieve, from the memory, a machine learning model that corresponds to the received customer digital certificate;
load the retrieved machine learning model into a processing component configured to execute the retrieved machine learning model, wherein the processing component is a processing circuit that is configured to obtain information from the retrieved machine learning model; and
process customer data using the information obtained from the machine learning model executed on the processing component.

2. The data storage device of claim 1, wherein the processing component is a processing circuit of the data storage device.

3. The data storage device of claim 1, wherein the memory is further configured to store the customer data, and wherein the data storage controller is further configured to process the customer data by being further configured to relocate the customer data within the memory based on the information obtained from the executed machine learning model.

4. The data storage device of claim 1, wherein the data storage controller is further configured to process the customer data by being further configured to prefetch the customer data from the memory based on predictions obtained from the executed machine learning model.

5. The data storage device of claim 1, wherein the data storage controller is further configured to modify or replace the machine learning model that corresponds to the received customer digital certificate based on instructions received from the customer host computer.

6. The data storage device of claim 1, wherein the data storage controller is further configured to receive a pre-trained binary of a replacement machine learning model to replace the machine learning model that corresponds to the received customer digital certificate.

7. The data storage device of claim 1, wherein the stored plurality of machine learning models comprises at least one default machine learning model provided by an original equipment manufacturer (OEM) of the data storage device.

8. The data storage device of claim 7, wherein the data storage controller is further configured to replace the at least one default machine learning model with a customer-provided machine learning model.

9. The data storage device of claim 8, wherein the data storage controller is further configured to verify the customer-provided machine learning model before replacing the at least one default machine learning model with the customer-provided machine learning model.

10. The data storage device of claim 9, wherein the data storage controller is further configured to verify the customer-provided machine learning model by being further configured to detect out-of-range outputs from the customer-provided machine learning model.

11. The data storage device of claim 1,
wherein the processing component is within the customer host computer, and
wherein the data storage controller is further configured to load the retrieved machine learning model into the processing component by being further configured to transfer a copy of the retrieved machine learning model to the processing component of the customer host computer for execution therein.

12. The data storage device of claim 11, wherein the data storage controller is further configured to transfer secure enclave execution information to the customer host computer to enable execution of the copy of the retrieved machine learning model within a secure enclave within the customer host computer.

13. The data storage device of claim 12, wherein the data storage controller is further configured to verify an integrity of the secure enclave by being further configured to:
request the secure enclave of the customer host computer to calculate a current hash value for the copy of the retrieved machine learning model;
receive the calculated hash value from the secure enclave of the customer host computer and a digital certificate signed with a customer private key; and
verify the integrity of the secure enclave based on the calculated hash value and the digital certificate signed with the customer private key.

14. The data storage device of claim 1,
wherein the plurality of machine learning models comprises two or more models configured for different workloads or applications, and wherein the data storage controller is further configured to process the customer data using a particular machine learning model selected from the two or more models based on a particular workload or application of the different workloads or applications.

15. A method for use by a data storage controller of a data storage device, the method comprising:

receiving, from a customer host computer, a customer digital certificate comprising respective cryptographic key information and corresponding to one of a plurality of machine learning models stored in a memory of the data storage device along with corresponding customer digital certificates each comprising respective cryptographic key information;

retrieving, from the memory, a machine learning model that corresponds to the received customer digital certificate;

loading the retrieved machine learning model into a processing component configured to execute the retrieved machine learning model, wherein the processing component is a processing circuit that is configured to obtain information from the retrieved machine learning model; and processing customer data using the information obtained from the machine learning model executed on the processing component.

16. The method of claim 15, wherein loading the retrieved machine learning model into the processing component comprises loading the retrieved machine learning model into a processing circuit of the data storage device.

17. The method of claim 15, wherein the customer data is stored in the memory and wherein processing the customer data comprises relocating customer data within the memory based on the information obtained from the executed machine learning model.

18. The method of claim 15, wherein processing the customer data comprises prefetching customer data from the memory based on predictions obtained from the executed machine learning model.

19. The method of claim 15, further comprising:

modifying or replacing the machine learning model that corresponds to the received customer digital certificate based on instructions received from the customer host computer.

20. The method of claim 15, wherein the stored plurality of machine learning models comprises at least one default machine learning model provided by an original equipment manufacturer (OEM) of the data storage device, and wherein the method further comprises replacing the at least one default machine learning model with a customer-provided machine learning model.

21. The method of claim 15, wherein the plurality of machine learning models comprises a transferable machine learning model, and wherein the method further comprises transferring a copy of the transferable machine learning model to the customer host computer for execution therein.

22. The method of claim 21, further comprising:

transferring secure enclave execution information to the customer host computer along with the copy of the transferable machine learning model to enable execution of the transferable machine learning model within a secure enclave within the customer host computer.

23. The method of claim 22, further comprising: verifying an integrity of the secure enclave by:

requesting the secure enclave of the customer host computer to calculate a current hash value for the copy of the transferable machine learning model;

receiving the calculated hash value from the enclave of the customer host computer and a digital certificate signed with a customer private key; and verifying the integrity of the secure enclave based on the calculated hash value and the digital certificate signed with the customer private key.

24. The method of claim 15, wherein the plurality of machine learning models comprises two or more models configured for different workloads or applications, and wherein the method further comprises processing the customer data using a particular machine learning model selected from the two or more models based on a particular workload or application of the different workloads or applications.

25. An apparatus for use with a data storage device, the apparatus being implemented by one or more circuits comprising:

means for receiving, from a customer host computer, a customer digital certificate comprising respective cryptographic key information and corresponding to one of a plurality of machine learning models stored in a memory of the data storage device along with corresponding customer digital certificates each comprising respective cryptographic key information;

means for retrieving, from the memory, a machine learning model that corresponds to the received customer digital certificate;

means for loading the retrieved machine learning model into a processing component configured to execute the retrieved machine learning model, wherein the processing component is a processing circuit that is configured to obtain information from the retrieved machine learning model; and means for processing customer data using the information obtained from the machine learning model executed on the processing component.

* * * * *